US006242043B1

(12) United States Patent
Lipp

(10) Patent No.: US 6,242,043 B1
(45) Date of Patent: Jun. 5, 2001

(54) METHOD OF IMPROVING MOISTURE RESISTANCE FOR INORGANIC MATERIALS THAT ARE SENSITIVE TO MOISTURE

(75) Inventor: Steven Lipp, Cranbury, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/473,413

(22) Filed: Dec. 28, 1999

Related U.S. Application Data

(60) Provisional application No. 60/125,875, filed on Mar. 24, 1999.

(51) Int. Cl.[7] .................................................. B05D 5/112
(52) U.S. Cl. .............................. 427/64; 427/71; 427/212; 427/215
(58) Field of Search ............................. 428/403; 427/180, 427/212, 213.31, 213.32, 215, 218, 64, 66, 67, 71

(56) References Cited

U.S. PATENT DOCUMENTS 3,617,332 * 11/1971 Lehmann .
3,791,844 * 2/1974 Tecotzky et al. .
4,684,539   8/1987 Chenot et al. .

OTHER PUBLICATIONS

International Search Report for PCT/US00/07940, filed Mar. 24, 2000.

* cited by examiner

Primary Examiner—Fred J. Parker
(74) Attorney, Agent, or Firm—William J. Burke

(57) ABSTRACT

A method of providing moisture resistance of inorganic particles such as alkaline earth metal aluminate phosphors comprising firing the phosphor in the presence of ammonium fluoride or ammonium difluoride at a temperature of at least 500° C. The phosphor particles become coated with a moisture-impervious coating that does not degrade the luminescence of the phosphors and can withstand complete immersion in water for long periods of time.

7 Claims, 2 Drawing Sheets

METHOD OF IMPROVING MOISTURE RESISTANCE FOR INORGANIC MATERIALS THAT ARE SENSITIVE TO MOISTURE

This application claims priority from copending Provisional application Ser. No. 60/125,875 filed Mar. 24, 1999.

This invention relates to improving the moisture resistance of inorganic materials that are sensitive to moisture. More particularly, this invention relates to forming a moisture impervious barrier on alkaline earth metal aluminate phosphors.

BACKGROUND OF THE INVENTION

Alkaline earth aluminate phosphors are known and are available commercially. For example, strontium aluminate phosphors activated with europium emit in the green region of the spectrum. These phosphors are long persistence phosphors which are highly desirable. However, their luminescence disappears after exposure of the phosphor to moisture. Hydrolysis of the phosphor begins after only a few minutes of exposure to moisture, as determined by an increase in pH from about 6 to about 11. The solid phosphor powders also begin to coalesce to form aggregates or even a hard block of cement-like material that is no longer useful. Phosphorescence decreases more slowly, but the phosphor emission becomes very dim after a few hours.

This sensitivity to moisture severely limits the utility of the phosphor, which must be kept away from moisture, as by formulating in a nonaqueous medium.

Other inorganic materials are known to be sensitive to moisture, such as calcium aluminate, barium aluminate, strontium sulfide, calcium sulfide, barium silicate, (CaSrBa) thioaluminate, strontium thiosulfate and the like.

Thus an effective method of protecting each of such inorganic material from moisture would be highly desirable.

SUMMARY OF THE INVENTION

I have found that inorganic materials that are reactive with ammonium fluoride and ammonium difluoride can be coated using ammonium fluoride or ammonium difluoride by firing at a temperature of at least 500° C. The resultant coating is moisture impervious and protects the inorganic particles from the adverse effects of exposure to water. In the case of alkaline earth aluminate phosphors in particular, they can be coated with a moisture impervious coating without changing the long persistence or color of the phosphor.

DETAILED DESCRIPTION OF THE INVENTION

Figure 1:
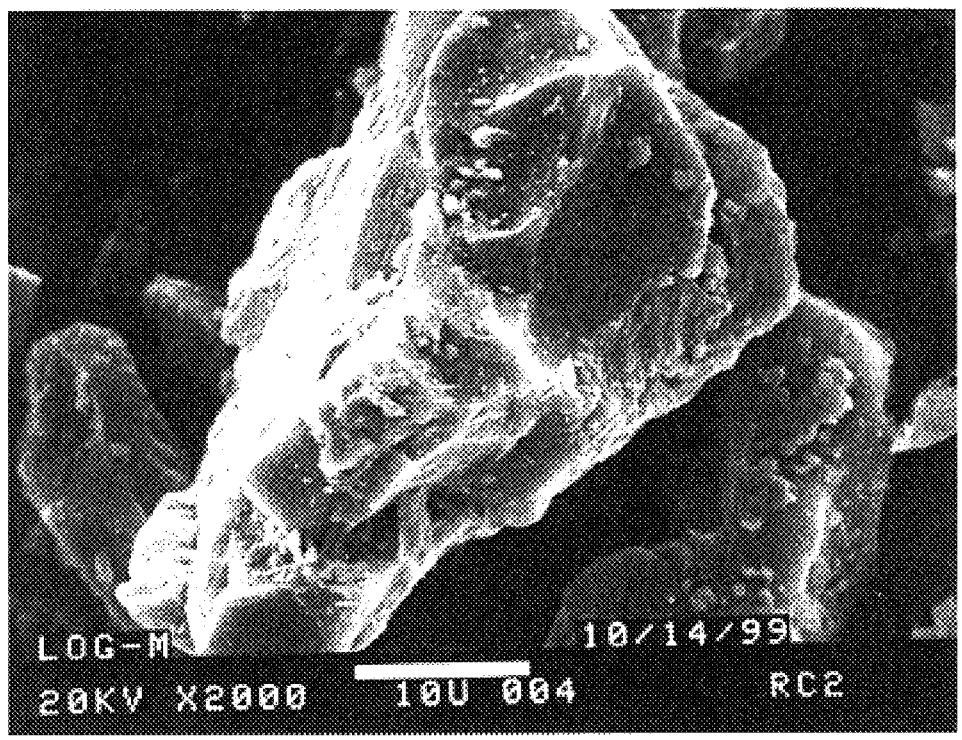
FIG. 1 is a SEM photomicrograph illustrating alkaline earth aluminate phosphor particles that are uncoated.

I have found that by heating inorganic materials such as alkaline earth aluminate phosphors with ammonium fluoride or ammonium difluoride to a suitable elevated temperature, a solid, stable, moisture resistant coating is applied to the phosphor particles.

It is believed a hard, moisture impervious coating is formed on the surface of the inorganic phosphor particles by reaction with the ammonium fluorides. This moisture impervious coating not only protects the material from moisture in the air, but material can even be placed in water at room temperature for five months without damage to the material caused by moisture. Several days in warm water (55°) and a short exposure to boiling water were also non-destructive.

Europium activated strontium aluminate phosphor is commercially available and it fluoresces in the green region of the spectrum. The present method is also applicable to other alkaline earth phosphors such as barium aluminate and calcium aluminate, blends thereof such as SrCa aluminate and SrBa aluminate, and other rare earth activators.

The amount of ammonium fluoride fired together with the inorganic phosphor particles can vary from about 1:3 to 1:6 ratio by weight. The two ingredients are stirred together and placed in a closed crucible and fired at a temperature of at least 500° C., and preferably at higher temperatures of 600–700° C. to form a moisture impervious coating.

The invention will be further described in the following examples, but it is to be understood that the invention is not to be limited to the details described therein.

EXAMPLE 1

Four grams of europium activated strontium aluminate phosphor particles were mixed with varying amounts of ammonium fluoride and fired at 600° C. in a closed crucible.

Part A

When 0.1 gram of ammonium fluoride was used, the improvement in moisture resistance was only marginal.

Part B

When 1.0 gram of ammonium fluoride was used, the phosphor acquired long term resistance to hydrolysis.

A sample of the coated phosphor of Part B was placed in water which was brought to and maintained at the boiling point. No degradation in the phosphor was noted until boiling had continued for 5 hours. After 22 hours in boiling water, the pH rose only to 8, and the phosphor was still substantially unchanged in its luminescence properties.

EXAMPLE 2

Various amounts of ammonium fluoride were added in 5 gram increments from 20–40 grams to 120 gram samples of europium activated strontium aluminate green phosphor and then fired in a closed crucible. As the amount of ammonium fluoride added was increased, the resistance to hydrolysis of the resulting phosphor also increased. There was also an increase in sample weight of the phosphor after firing of from 5 to 9 grams, indicating takeup of fluoride by the phosphor.

When 40 grams of ammonium fluoride were added to 120 grams of the phosphor and firing carried out at 600° C., there was a significant improvement in moisture resistance. An increase in temperature did not change the weight gain of the samples, but did increase the resistance of the phosphor to water. However, when the firing temperature was increased to 800° C., the luminescence was completely destroyed.

Optimum results were obtained by firing at 700° C. for six hours using 40 grams of ammonium fluoride to 120 grams of the phosphor. Using additional amounts of ammonium fluoride probably would not enhance the moisture resistance, but would reduce the phosphor brightness.

FIG. 1 is a photograph of uncoated europium doped strontium aluminate phosphor particles at 2000 times magnification.

Figure 2:
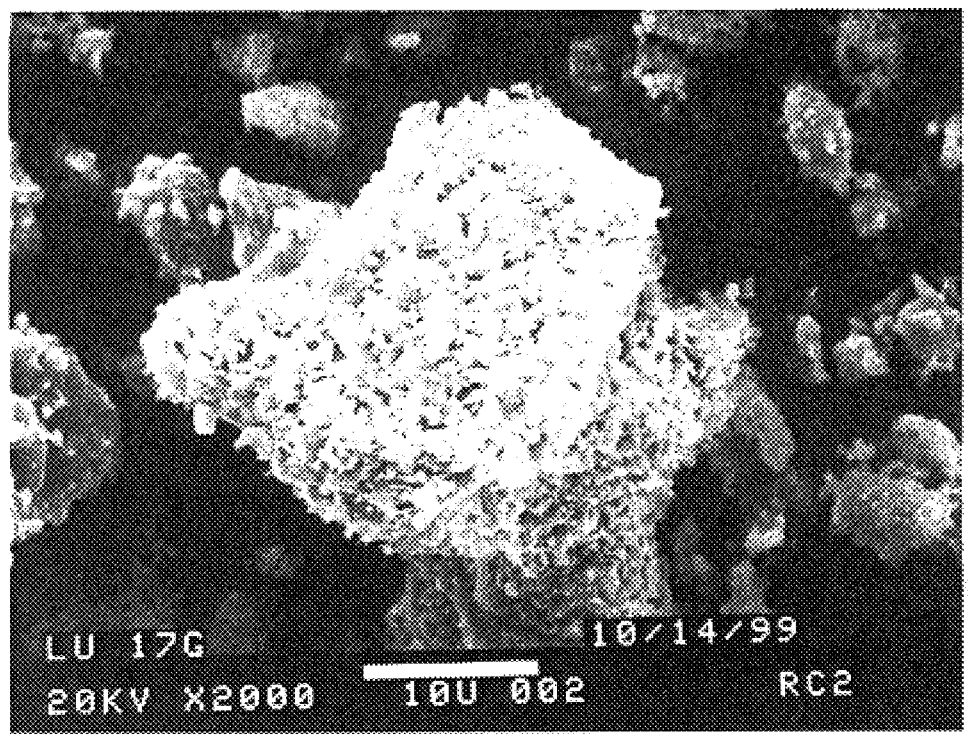
FIG. 2 is a photomicrograph illustrating alkaline earth aluminate phosphor particles having a solid fluoride-containing coating thereon.

FIG. 2 is a photograph of fluoride coated europium doped strontium aluminate phosphor particles at 2000 times magnification. The fluoride coating is apparent from its flocculent appearance. The coating was determined to be cubic strontium fluoride by x-ray diffraction.

Figure 3:
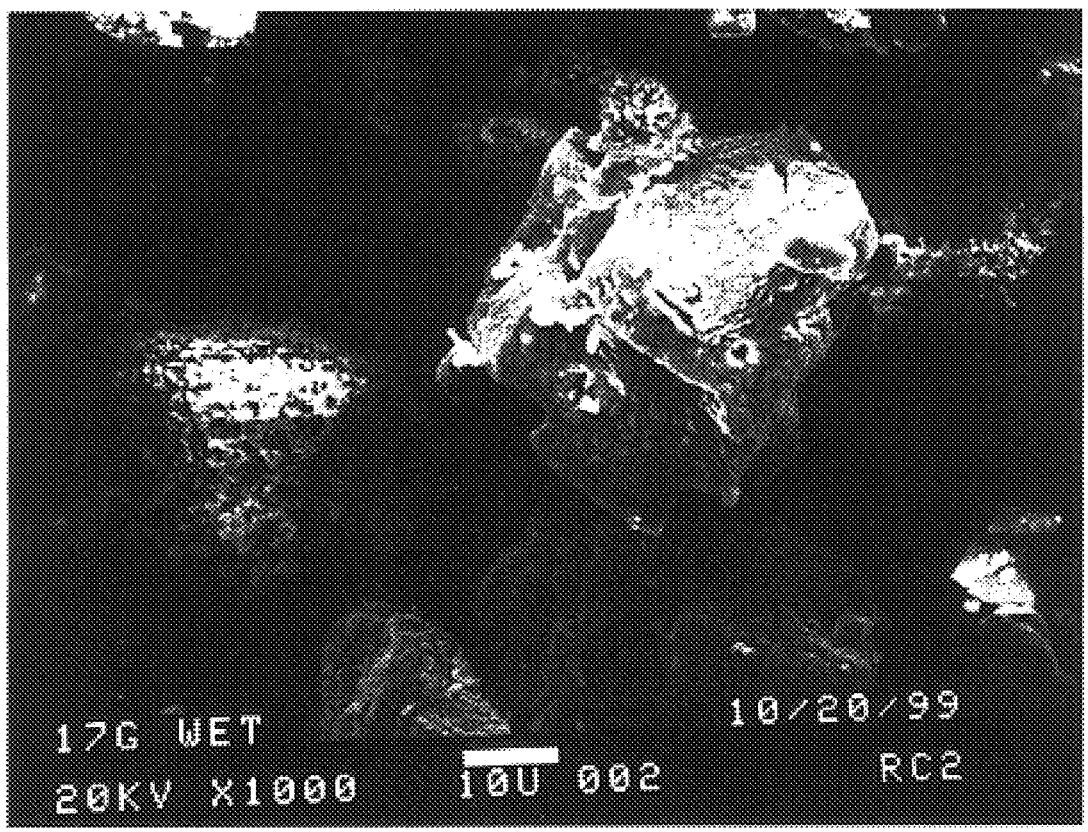
FIG. 3 is a photomicrograph illustrating alkaline earth aluminate phosphor particles having a solid coating thereon after five months of immersion in water.

FIG. 3 is a photograph of the fluoride coated phosphor as above after the phosphor particles were soaked in water for five months. The coating is intact, and the phosphor still retained its luminescence, and was free flowing with no aggregates.

Various changes can be made to the proportion of ammonium fluoride and firing temperature as will be apparent to one skilled in the art, without departing from the moisture impermeability of the phosphor particles. Thus the invention is only to be limited by the scope of the appended claims.

I claim:

1. A method of improving the moisture resistance of inorganic water-sensitive particles which comprises forming a mixture of the inorganic particles and a sufficient amount of ammonium fluoride or ammonium difluoride particles and firing at a temperature of at least 500° C. to coat the particles with a moisture impervious fluorine-containinq coating.

2. A method according to claim 1 wherein the firing temperature is from about 600 up to 800° C.

3. A method according to claim 1 wherein the inorganic phosphors particles are alkaline earth aluminate phosphor.

4. A method according to claim 3 wherein the phosphors are a strontium aluminate phosphor.

5. A method according to claim 4 wherein the phosphor particles are europium-doped strontium aluminate phosphor.

6. A method according to claim 3 wherein the ratio of phosphor particles to ammonium fluoride or ammonium difluoride is from about 3:1 to about 6:1 by weight.

7. A method according to claim 5 wherein the phosphor and ammonium fluoride mixture is fired at about 700° C.

* * * * *